(12) United States Patent
Hou

(10) Patent No.: US 6,546,152 B1
(45) Date of Patent: Apr. 8, 2003

(54) METHOD AND APPARATUS FOR PROVIDING IMAGES IN PORTABLE 2-D SCANNERS

(75) Inventor: Alpha Hou, San Jose, CA (US)

(73) Assignee: Syscan Technology (Shenzhen) Co. Limited, Shenzhen (CN)

( * ) Notice: Subject to any disclaimer, the term of this patent is extended or adjusted under 35 U.S.C. 154(b) by 0 days.

(21) Appl. No.: 09/565,206

(22) Filed: May 4, 2000

(51) Int. Cl.⁷ .................................................. G06K 9/36
(52) U.S. Cl. ........................ 382/284; 382/294; 382/254; 382/312
(58) Field of Search ................................ 382/284, 294, 382/254, 260, 264, 312, 313; 358/473, 474

(56) References Cited

U.S. PATENT DOCUMENTS 6,075,905 A * 6/2000 Herman et al. ............. 382/284
6,205,259 B1 * 3/2001 Komiya et al. ............. 382/284
6,459,821 B1 * 10/2002 Cullen ......................... 382/294
6,493,469 B1 * 12/2002 Taylor et al. ................ 382/284

\* cited by examiner

Primary Examiner—Phuoc Tran
(74) Attorney, Agent, or Firm—Joe Zheng

(57) ABSTRACT

A method and apparatus for providing images in 2-D scanners are disclosed. According to one aspect of the system, a series of images are successively generated from a sensing module in a scanner as the scanner is moving across a scanning document. A first image is initially kept in a memory. When a second image becomes available, an overlapping between the first image and the second image is located. From the overlapping, it is to determine if the stored first image is precisely registered with the second image. If the two images are registered, a signal-to-noise enhanced image is obtained by averaging the two images. If the two images are not registered, a combined image is obtained by combining the two images. Either the signal-to-noise enhanced image or the combined image is then stored in the memory to work with the next image. The process is repeated till all the images are processed. As a result, a signal-to-noise enhanced image or a combined image representing the entire document is produced.

26 Claims, 6 Drawing Sheets

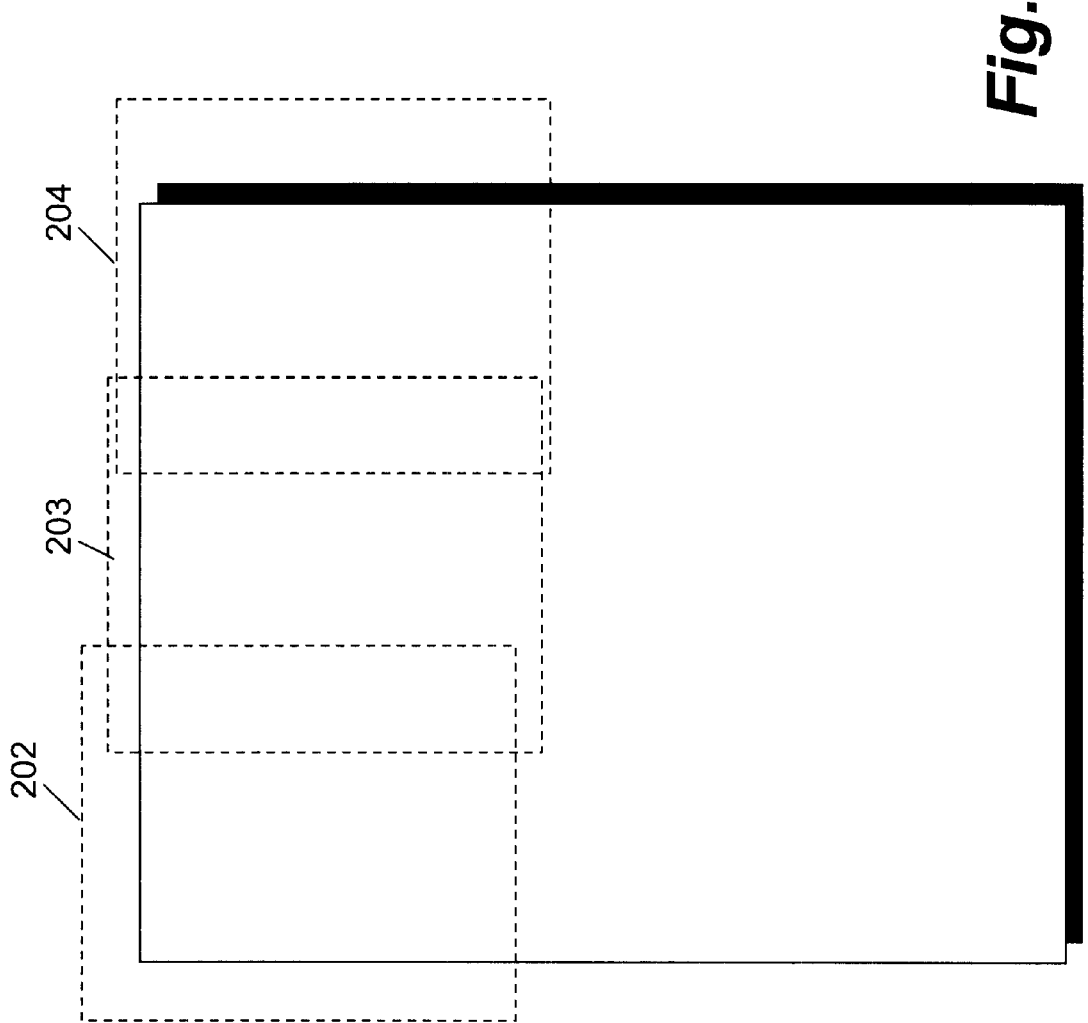

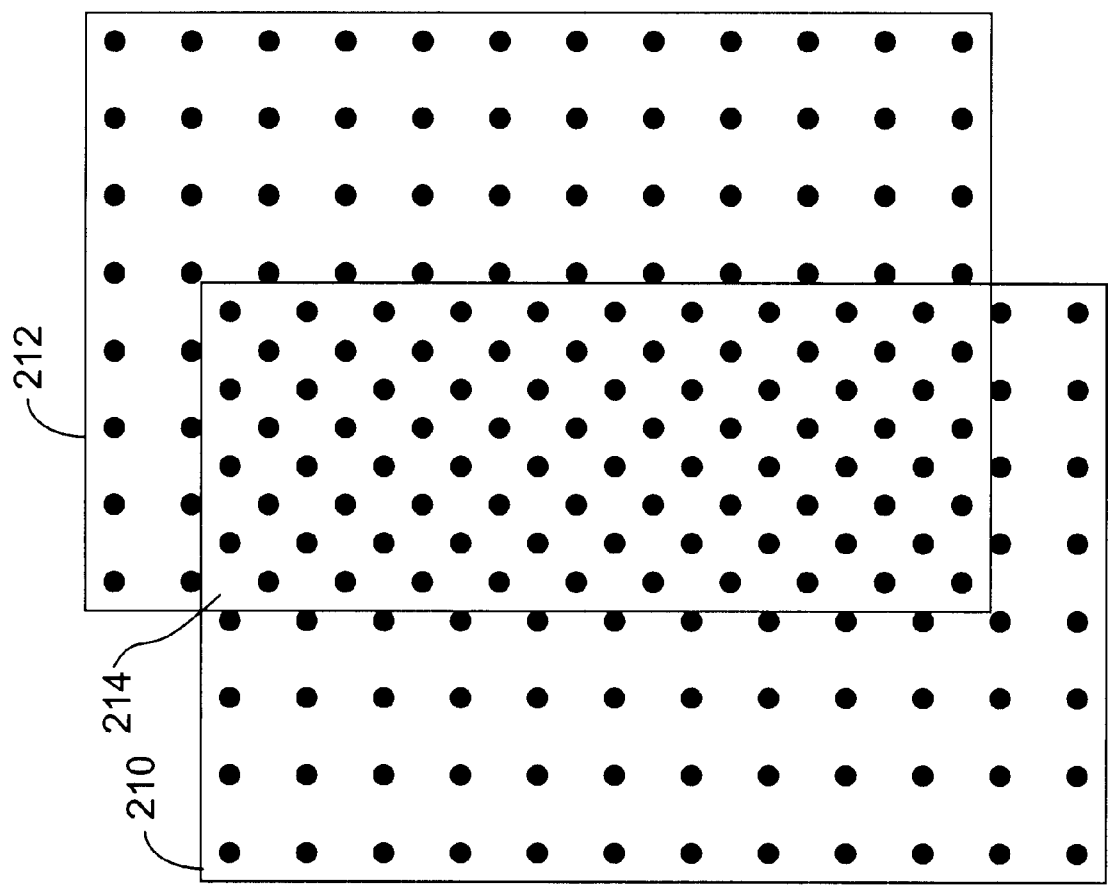

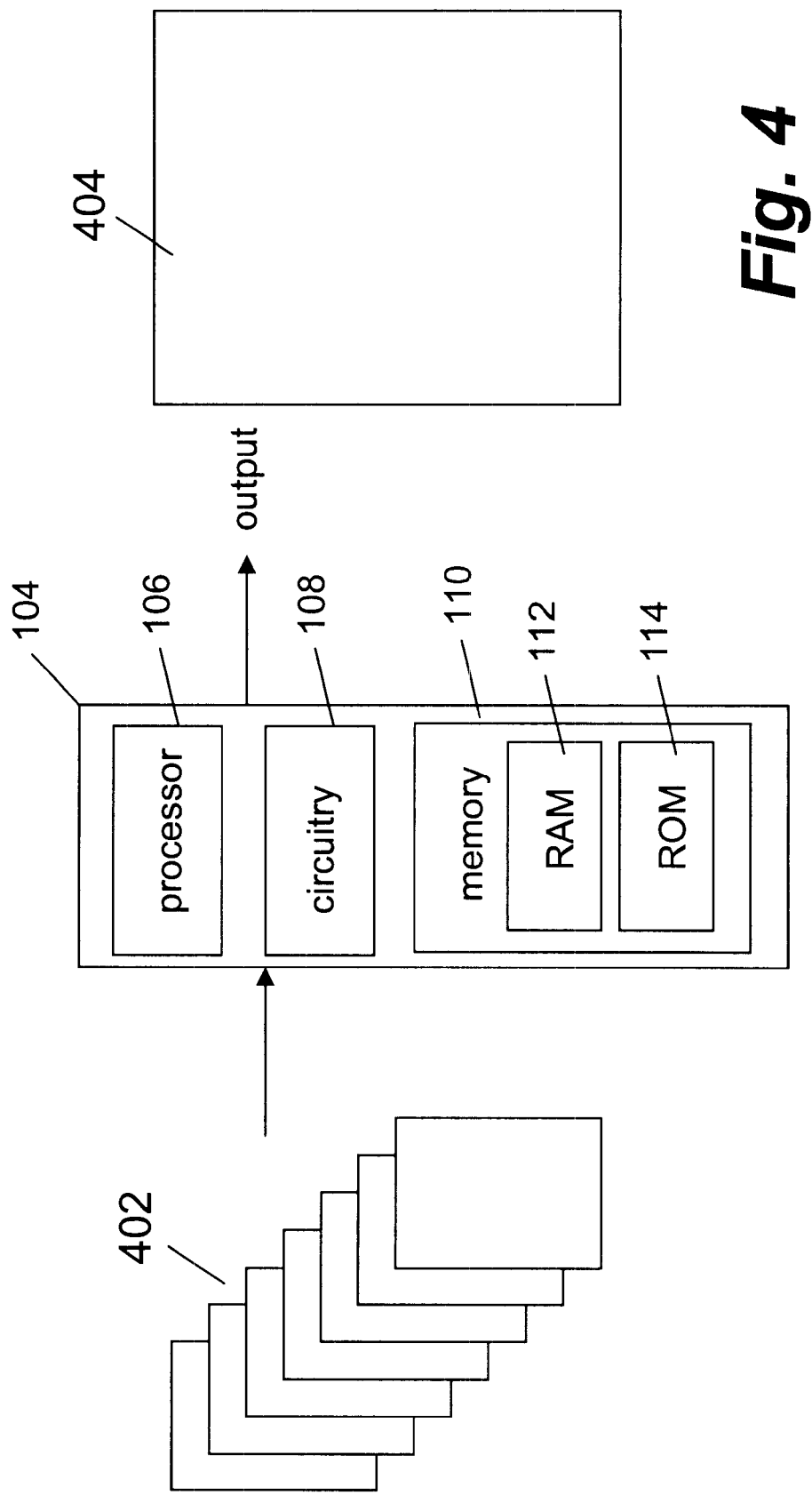

METHOD AND APPARATUS FOR PROVIDING IMAGES IN PORTABLE 2-D SCANNERS

BACKGROUND OF THE INVENTION

1. Field of the Invention

The present invention generally relates to image processing systems and more particularly relates to a method and apparatus for providing scanned images from a portable 2-D scanner.

2. Description of the Related Art

There are many applications that need optical scanners to convert paper-based objects, such as texts and graphics, to an electronic format that can be subsequently analyzed, distributed and archived. One of the most popular optical scanners is flatbed scanners that convert scanning objects, including pictures and papers, to images that can be used, for example, for building World Wide Web pages and optical character recognition. Another popular optical scanner is what is called sheet-fed scanners that are small and unobtrusive enough to sit between a keyboard and a computer monitor or integrated into a keyboard to provide a handy scanning means. Nearly all of the scanners are scrolling types, namely a scanner and a scanning document must move against each other in order to scan the entire scanning document. Typically, this type of scanner uses a one-dimensional linear sensor to sense the entire scanning document. Further the trend of the scanner design is getting smaller and more portable.

With the increasing popularity of portable computing devices, such as personal data assistants (PDA), there is an emerging need for scanners that should be even smaller or simply integrated within a portable computing device. One of the exemplary portable computing devices may be a Palm Pilot from 3Com, Inc., it would be great convenience if the Palm Pilot is equipped with a scanning capability so that a user of a Palm Pilot can scan in a document in various working conditions.

Nevertheless, a document has a certain size, for example 8 by 11.5 inches in compliance with the US standard paper size. To scan in such document, the scrolling type scanners could not be designed smaller than the width of a scanning document. The past efforts have been focused on two-dimensional image sensors. For example a digital camera that can be designed much smaller than a document may be used to image the document. The digital camera uses a two-dimensional image sensor to take a snapshot of a scene. However, the resolution requirement for a scanned image is generally of quite high, typically from 300 to 600 dot-per-inch (dpi). Thus the two-dimensional image sensor in the digital camera has to be tremendously high, which becomes a major factor in the cost of such image sensor. As a result, using digital cameras for scanning documents is not yet popular.

There is therefore a need for solutions that can render a digital camera with a regular image sensor suitable for document scanning while providing high resolution images.

SUMMARY OF THE INVENTION

The present invention has been made in consideration of the above described problems and needs and has particular applications to scanners using 2-dimensional image sensors. Traditionally, a scanner could not be designed smaller than a width of a document as the document has to be scanned across for a good image resolution. When using a digital camera to take a snapshot of the document, the result image resolution is often too low to be a practical useful image. With the present invention, the digital camera can be used to provide a scanned image with high resolution. Further scanners employing the present invention can be designed as small as a palm size or integrated with many portable devices such as a Palm Pilot or a cellular phone.

According to one aspect of the present invention, a series of images are successively generated from a sensing module in a scanner as the scanner is moving across a scanning document. A first image is initially kept in a memory. When a second image becomes available, an overlapping between the first image and the second image is located. From the overlapping, it is to determine if the stored first image is precisely registered with the second image or vice verser. If the two images are completely registered, a signal-to-noise enhanced image or an image of better resolution is obtained by averaging the two images or an interpolation process. If the two images are not registered, an combined image is obtained by first rescalling one of the images accordingly and followed by combining the two images (one of which is rescaled). Either the signal-to-noise enhanced image or the enlarged/combined image is then stored in the memory to work with a next image. The process is repeated till all the images are processed. As a result, a combined or an enlarged image representing the entire document is produced.

The present invention may be implemented in numerous ways including a method, a computer readable medium, a system, or an apparatus, each yields one or more of the following benefits and advantages. One of them is the possibility of introducing a scanner much smaller than a document while still producing scanned images of high resolution and quality. Another one is a soft scanner that can be loaded in any computers equipped with a camera. Working along with the soft scanner, the camera provides a necessary means to provide images to the soft scanner that subsequently produces scanned images.

Other objects, benefits and advantages together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2A shows a document being imaged successively, resulting in a series of images, each representing a portion of the document;

FIG. 2B shows two neighboring images and at the pixel detail;

FIG. 4 shows the detail of a circuit board of FIG. 1 according to one embodiment.

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

Figure 1:
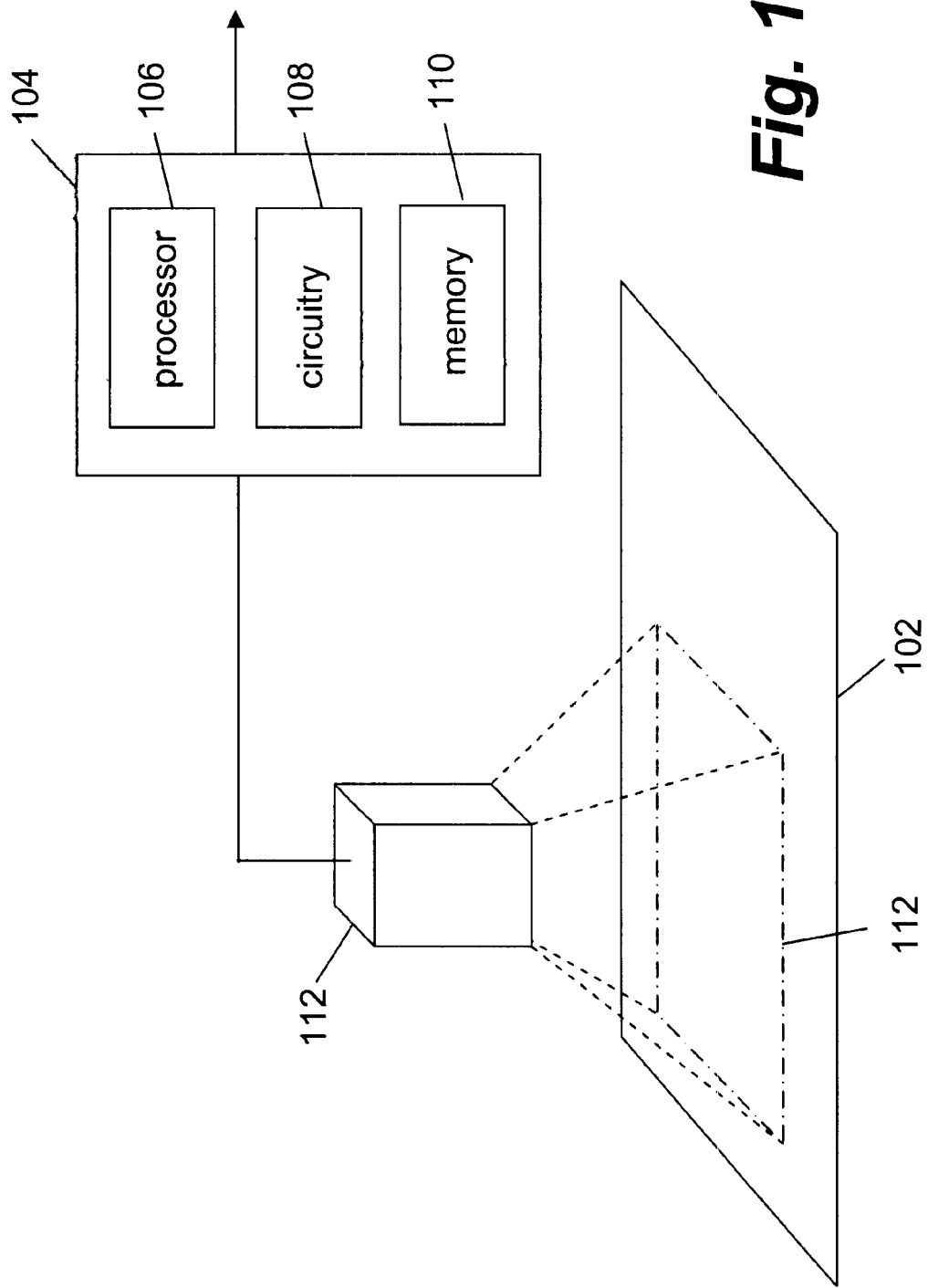
FIG. 1 illustrates a configuration in which the present invention may be practiced.

FIG. 1 illustrates a configuration in which the present invention may be practiced. Camera 100 is an image capturing device that includes a two-dimensional image sensor and possibly an illumination source projecting light onto document 102. The operation of camera 100 is to take a snapshot upon an activation of a key that may be a button integrated with camera 100 and accessible by a user. The image signals or data are transported to circuit board 104 that may be integrated within the camera or in a separate device depending on the type of the camera. Circuit board 104 comprises a processor 106 that controls the operations of circuitry 108 and memory 110. Preferably a compiled and linked version, referred to as a processing module herein, implementing one embodiment of the present invention is loaded in memory 110. When executed by processor 106, the processing module is caused to perform desired functions as to be described in detail below. Alternatively, the same functions could be implemented in combination of various circuits that are collectively in circuitry 108. Those skilled in the art will appreciate, by the detailed description of the functions below, how to implement the processing module using a programming language such as C or a processor-oriented assembly language as well as the circuits to achieve the functions.

Examples of camera 100 may include, but not be limited to, a handheld device having an imaging capability, a PC camera and a digital camera. It is understood that circuit board 104 can be integrated within camera 100 when camera 100 is a handheld device. For example, a Palm Pilot from 3Com, Inc. when equipped with the imaging capability, can house circuit board 104 so that the output from the device is a scanned image of the entire document 102. Conversely, circuit board 104 can be a separate piece from camera 100 when camera 100 is for example a PC camera that outputs analog video signals to be digitized and processed in circuit board 104.

To facilitate the description of the present invention, it is assumed in the following that circuit board 104 receives image data in digital format from camera 100. It is clear that this is not a limitation to the invention as video signals can be always digitized to the digital format though an analog to digital conversation.

As shown in FIG. 1, camera 100 can not get an image covering the entire document 102 because of the required resolution. For example, a regular paper has a size of 8.5×11 inches. For 300 dpi (dot per inch) resolution, the image sensor must have a photodetecor resolution of 2550×3300, which can be extremely expensive in the current market. Clearly, the image quality will suffer when the image sensor has a smaller photodetecor resolution. To maintain the same image resolution while the image sensor does not have such high photodetecor resolution, the image from the camera must cover only a portion of document 102. In FIG. 1, it is shown that camera 100 takes a snapshot of a local area 112 of document 102 to maintain a high image resolution.

To cover the entire document 102, a user of camera 100 has to move camera 100 around document 102, resulting in a series of images as shown in FIG. 2A. Images 202–204 are examples of a series of images as a result of moving camera 100 with respect to document 102 and typically created when a user activates the operation of the camera when it is caused to move from one position to another. Each of the images represents one snapshot of a local portion of the document. It is assumed herein each of the images has a common resolution that substantially close to the general image resolution required in a scanned image, for example, 300 dpi or 600 dpi. When these images are combined properly, a final scanned image representing the entire document is created.

Figure 2C:
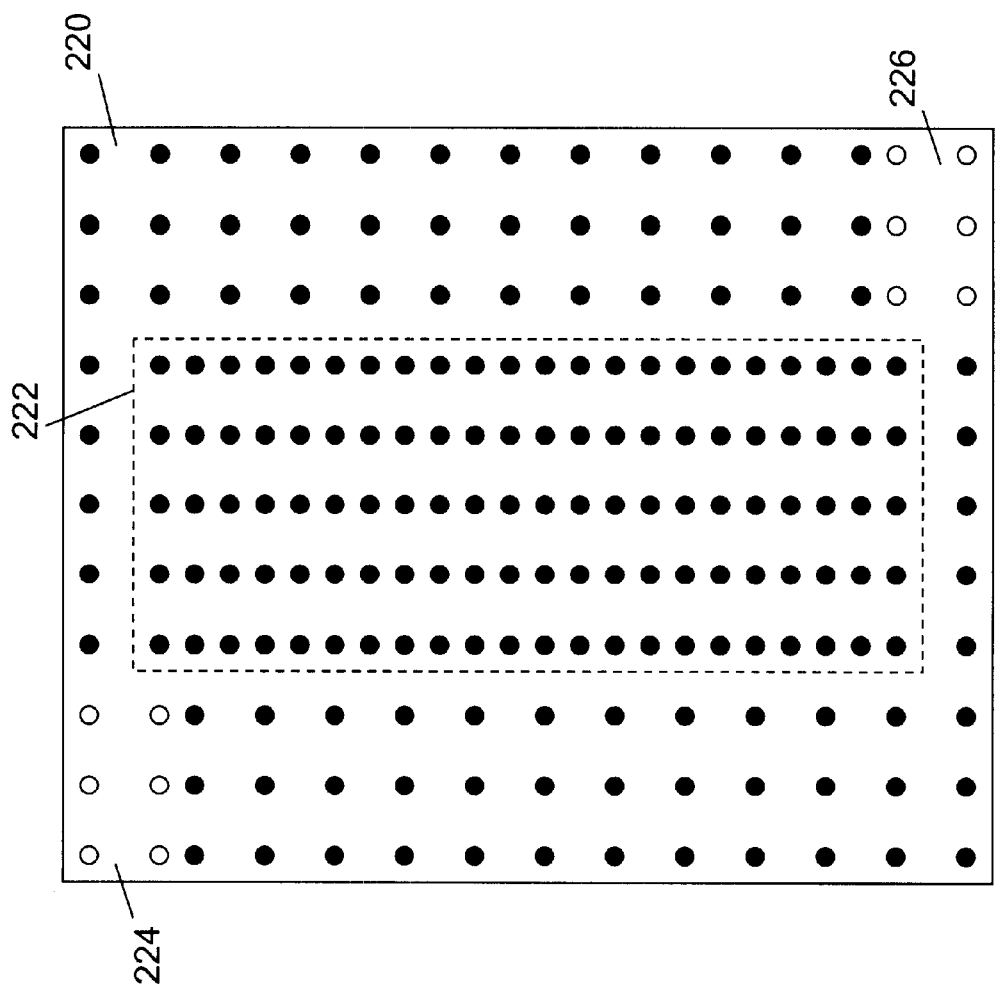
FIG. 2C illustrates an enlarged image generated from combining two neighboring images.

One of the important features in the present invention is a method and apparatus for combining neighboring images together provided that each pair of two neighboring images have an substantial overlapping in between. FIG. 2B shows two neighboring images 210 and 212 at the pixel detail. As shown in the figure, images 210 and 212 have a substantial overlapping 214 that is from the same area of a document. Typically, pixels in overlapping 214 from images 210 and 212 are not necessarily registered on a pixel basis, namely one pixel not superimposed over another one. From a resolution perspective, these non-registered pixels in overlapping 214 provide additional information between pixels in the original image 210 or 212. Therefore an enlarged image 220 shown in FIG. 2C can be constructed with respect to the overlapping.

There are a number of ways to construct an enlarged image 220 based on overlapping 214 from images 210 and 212. A typical approach is to find a matched area in images 210 and 212 using a template matching approach that is well known in the art, for example, by computing correlation coefficients between the two images. When a matched (i.e. a common) area in images 210 and 212 is respectively found, overlapping 214 can be determined in terms of size and orientation. Enlarged image 220 can be then constructed using pixel interpolations so that the center portion 222 is obtained by combining the matched area from images 210 and 212. If overlaping 224 in each of images 210 and 212 is different in size, one of the two images may be resized so that overlapping 224 become the same size in each of the two images. There are a few available ways to resize or rescale an image with respect to a predefined size. One of the ways is to use an interpolation method that is well known in the art.

The resolution of center portion 222 is typically of high as the additional information between the pixels in one image is used in another image. In a rare case in which image pixels in overlapping 214 from images 210 and 212 are registered, the average of the registered pixels, not necessarily to increase the image resolution, will enhance the image quality in terms of, for example, the signal-to-noise ratio (SNR).

Generally, images 210 and 212 are not aligned or may possess some rotation with respect to each other. The boundary portions of enlarged image 220, for example 224 or 226, have to be filled up with pixels to make up enlarged image 220. Depending on the implementation preference, the filling may be done with a white color (255 in 8-bit scale) or a color interpolated from boundary pixels in one of the two images. After the combining process, enlarged image 220 is formed. The process can be applied successively to the rest of images generated while the camera is moving across a document being scanned. As a result, an enlarged image representing the entire document is produced.

Figure 3:
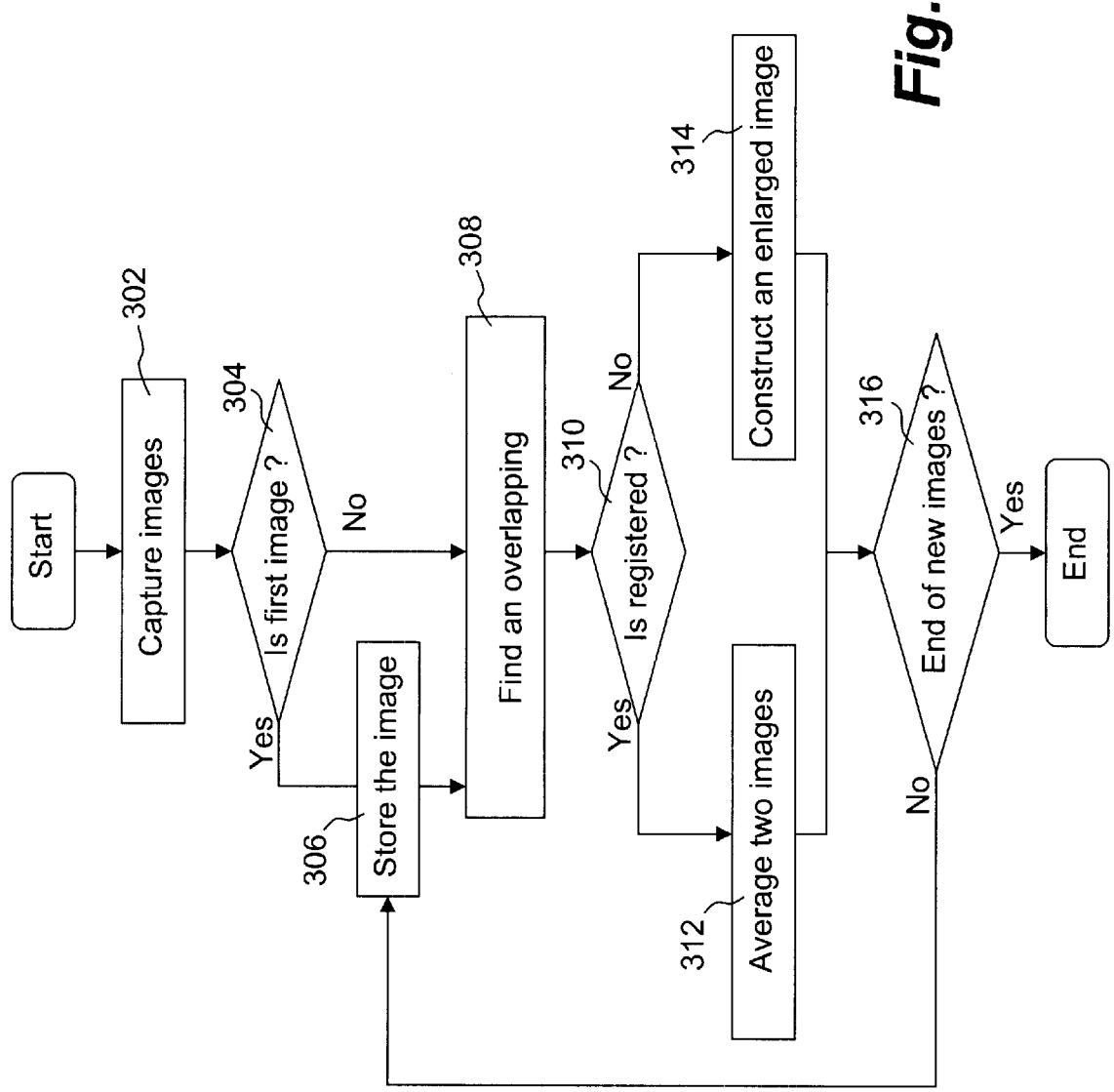
FIG. 3 illustrates the process flowchart according to one embodiment of the present invention.

FIG. 3 illustrates the process flowchart according to one embodiment of the present invention. At 302, a series of images are successively generated as a user of a portable 2-D scanner moves the scanner across a document to be scanned. When a very first image arrives at 304, the image is stored in memory such as RAM at 306. When a second image comes, the stored image in the memory is used together with the arrived second image to compute an overlapping between the two images at 308. The result is typically in terms of an approximate size in each of the two images. Based on the pixel values, possibly texture information if there are any, a computation can be carried out if the overlapping area in each of the two images is registered. When it is found that either the two images or the matched portions in the overlapping area of both images are registered, the two images are simply averaged, resulting in an SNR enhanced image at 312. When it is found that the two images are not registered precisely, an enlarged image is created by combining the two images constrained to the overlapping area at 314. As described above, if necessary, white or extended pixels from edge pixels may be added to the corners or edges that are caused by the uneven alignment of the two images. Further pixels may be interpolated from neighboring pixels to ensure every pixels in the enlarged image is valid. At 316, when a next image comes, the just obtained image (either the averaged image or the enlarged image) is to replace the first image stored in the memory. To be specific, the memory now stores the obtained image from the first two images. The processes 304, 308, 310 and 312 or 316 are repeated successively with a computed image in the memory and any new images. When a signal, for example from an activation of a button, comes to indicate the end of generating the series of the images, the image generated from processes 312 or 314 is the resultant scanned image of the document and may be readout, transported and even transmitted to a secondary device such as a storage, printer, or a processor.

The individual computation methods used in averaging the two images or creating the enlarged image are known to those skilled in the art. One of the examples that may be used to find the overlapping and the registration as well as to combine two images is provided in detail in a textbook by Anil K. Jain, "Fundamentals of Digital Image Processing", Prentice Hall, Inc., 1989, which is hereby incorporated by reference. The combination of these individual computation methods together with the application of a portable 2-D camera used as a 2-D scanner to generate a scanned image is believed novel.

FIG. 4 shows the detail of circuit board 104 of FIG. 1 according to one embodiment. The process flowchart may be implemented in a program written in a processor-oriented assembly language such as 8088 assembly and loaded in ROM 112 as a processing module. When the processing module is executed by processor 106, the processing module is caused to first store a very first image from a series of images 402 being generated into RAM 112 and start the process flow illustrated in FIG. 3. As soon as the last image in of images 402 is done, the processing module is caused to output an enlarged image 404 representing the entire document.

Those skilled in the art will appreciate by now that the present invention may be implemented in numerous ways including a method, a computer readable medium, a system, and an apparatus, each yields one or more of the following benefits and advantages. One of them is the possibility of introducing a scanner much smaller than a document while still producing scanner images of high resolution and quality. Another one is a soft scanner that can be loaded in any computers equipped with a camera. Working along with the soft scanner, the camera provides a necessary means to provide images to the soft scanner that subsequently produces scanned images.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A method for providing a scanned image of an object from a scanner using a two-dimensional image sensor, the method comprising:

receiving one of images from the image sensor;

locating an overlapping between the one of the images and a stored image in a memory, wherein the stored image has a substantial overlapping with the one of the images;

determining from the overlapping if the stored image is precisely registered with the one of the images;

producing a signal-to-noise enhanced image by averaging the stored image and the one of the images if the determining indicates that the stored image is precisely registered with the one of the images; and producing a combined image by combining the stored image with the one of the images if the determining indicates that the stored image is not registered with the one of the images.

2. The method as recited in claim 1, wherein the images are successively generated by a two-dimensional image sensor in the scanner when a user of the scanner moves the scanner across the object.

3. The method as recited in claim 2, wherein the stored image is a first one of the images and the one of the images is a second image subsequent to the first one of the images.

4. The method as recited in claim 3, wherein the overlapping represents a common area of the object being represented by the stored image and the one of the images.

5. The method as recited in claim 1, wherein each of the images represents a portion of the object and the combined image represents the entire object.

6. The method as recited in claim 5, wherein each of the images has an equal size and identical image resolution.

7. The method as recited in claim 1 further comprising refreshing the memory by storing the signal-to-noise enhanced image if the determining indicates that the stored image is precisely registered with the one of the images.

8. The method as recited in claim 7 further comprising repeating the locating, the determining, one of the producings of claim 1 with another image subsequent to the one of the images.

9. The method as recited in claim 1 further comprising refreshing the memory by storing the combined image if the determining indicates that the stored image is not registered with the one of the images.

10. The method as recited in claim 9 further comprising repeating the locating, the determining, one of the producings of claim 1 with another image subsequent to the one of the images.

11. An apparatus for providing a scanned image of an object, the apparatus comprising:

an image sensing module including a two-dimensional image sensor, the image sensing module producing successively a series of images when a user moves the apparatus across the object;

first memory for storing an computed image, wherein the computed image is initially a first one in the series of images;

second memory for storing code for a processing module;

a processor coupled to the second memory causing the processing module, when the processing module is executed in the processor, to perform:

receive a next image;

locate an overlapping between the next image and a computed image in the first memory;

determine from the overlapping if the computed image is precisely registered with the next image;

produce a signal-to-noise enhanced image by averaging the computed image and the next image if the determining indicates that the computed image is precisely registered with the next image; and produce a combined image by combining the computed image with the next image if the determining indicates that the computed image is not registered with the next image.

12. The apparatus as recited in claim 11, wherein the overlapping represents a common area of the object being represented by the computed image and the next image.

13. The apparatus as recited in claim 12, wherein each of the images represents a portion of the object and the combined image represents the entire object.

14. The apparatus as recited in claim 13, wherein each of the images has an equal size and identical image resolution.

15. The apparatus as recited in claim 11, wherein the processing module is further caused to refresh the first memory by storing the signal-to-noise enhanced image if the determining indicates that the computed image is precisely registered with the next image.

16. The apparatus as recited in claim 11, wherein the processing module is further caused to refresh the first memory by storing the combined image if the determining indicates that the computed image is not registered with the next image.

17. A computer readable medium for storing computer program instructions for providing a scanned image of an object from a scanner using a two-dimensional image sensor, the computer readable medium comprising:

program code for receiving one of images from the image sensor;

program code for locating an overlapping between the image and a stored image in a memory, wherein the stored image has a substantial overlapping with the one of the images;

program code for determining from the overlapping if the stored image is precisely registered with the one of the images;

program code for producing a signal-to-noise enhanced image by averaging the stored image and the one of the images if the determining indicates that the stored image is precisely registered with the one of the images; and program code for producing a combined image by combining the stored image with the one of the images if the determining indicates that the stored image is not registered with the one of the images.

18. The computer readable medium as recited in claim 17, wherein the images are successively generated by a two-dimensional image sensor in the scanner when a user of the scanner moves the scanner across the object.

19. The computer readable medium as recited in claim 18, wherein the stored image is a first one of the images and the one of the images is a second image subsequent to the first image.

20. The computer readable medium as recited in claim 19, wherein the overlapping represents a common area of the object being represented by the stored image and the one of the images.

21. The computer readable medium as recited in claim 17, wherein each of the images represents a portion of the object and the combined image represents the entire object.

22. The computer readable medium as recited in claim 21, wherein each of the images has an equal size and identical image resolution.

23. The computer readable medium as recited in claim 17 further comprising refreshing the memory by storing the signal-to-noise enhanced image if the determining indicates that the stored image is precisely registered with the one of the images.

24. The computer readable medium as recited in claim 23 further comprising program code for repeating execution of the locating program code, the determining program code, one of the producing program codes of claim 17 with another image subsequent to the one of the images.

25. The computer readable medium as recited in claim 17 further comprising refreshing the memory by storing the combined image if the determining indicates that the stored image is not registered with the one of the images.

26. The computer readable medium as recited in claim 25 further comprising program code for repeating execution of the locating program code, the determining program code, one of the producing program codes of claim 17 with another image subsequent to the one of the images.

* * * * *